E. H. AMET.
BALANCED ELECTRICAL TRANSMITTER.
APPLICATION FILED JULY 6, 1915.
1,176,725.
Patented Mar. 21, 1916.
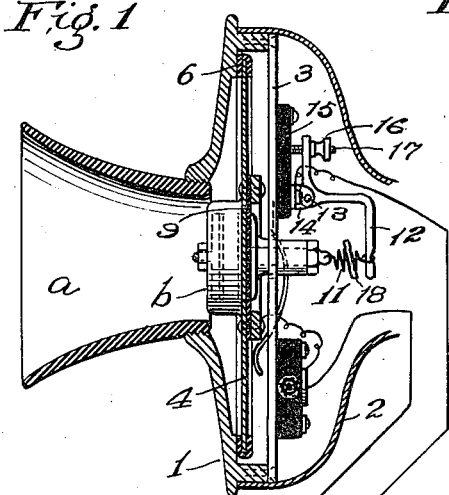
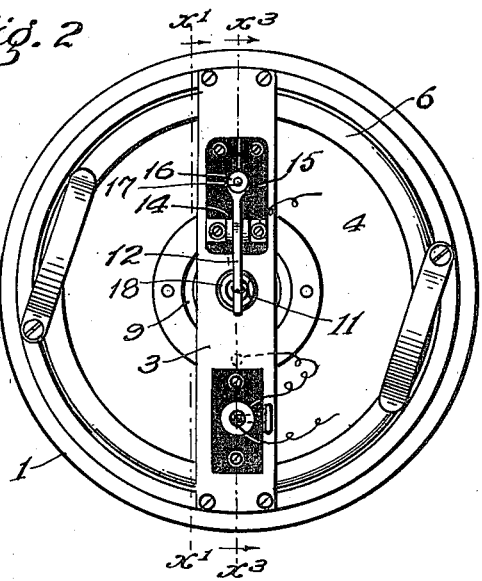
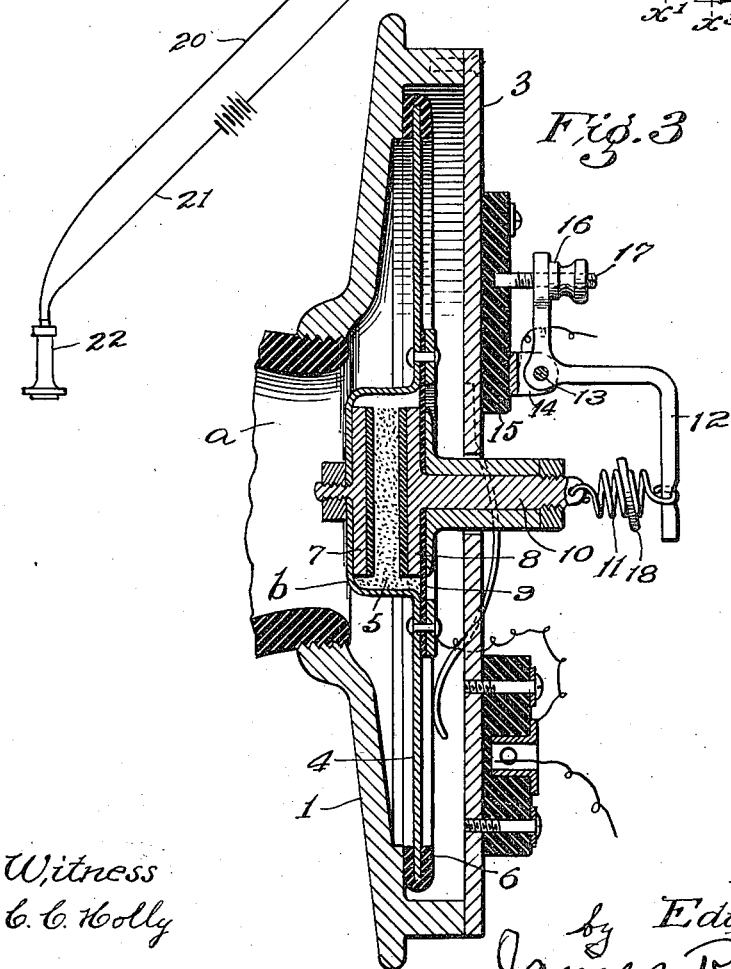
Witness
C. C. Holly
Inventor
Edward H. Amet
by James R. Townsend
his atty.

UNITED STATES PATENT OFFICE.

EDWARD H. AMET, OF REDONDO BEACH, CALIFORNIA.

BALANCED ELECTRICAL TRANSMITTER.

1,176,725.  Specification of Letters Patent.  Patented Mar. 21, 1916.

Application filed July 6, 1915. Serial No. 38,349.

*To all whom it may concern:*

Be it known that I, EDWARD H. AMET, a citizen of the United States, residing at Redondo Beach, in the county of Los Angeles and State of California, have invented a new and useful Balanced Electrical Transmitter, of which the following is a specification.

An object of the invention is to provide an extremely sensitive accurate microphone electrical transmitter adapted for use in connection with recording sound parts to accompany motion pictures, also for use in a telephone message recording system, for use in wireless telephony and for all other uses to which an electrical transmitter may be applied.

Another object is to provide an electrical transmitter that is self-adjusting to temperature changes, so that it will maintain a constant maximum efficiency adjustment of the variable electrical resistance, and will maintain the variable electrical resistance particles in relatively balanced position which will allow the resistance body the minimum and maximum proportional compression for the production of electrical impulses to be transmitted.

This invention includes an attachment which may be applied to constructions found in electrical transmitters of various types, thereby transforming said transmitters into self-adjusting and extremely sensitive transmitters that are not affected by temperature changes, and which will transmit minimum and maximum impulses in true proportion to the intensity of impulses received and when once adjusted will maintain the maximum working adjustment under all conditions so far as I am at present aware.

The invention is considered broad and basic in that I have provided an electrical transmitter in which the actuating diaphragm cannot change the fixed operative adjustment between the electrodes of the variable electrical resistance, a tension device putting the diaphragm under spring tension being applied whereby to draw apart or separate the electrodes and whereby the electrodes are made to form a part of a spring balance, thus forming a sensitive scale for indicating the intensity of the sound wave impulses received upon the transmitter diaphragm and producing upon the variable electrical resistance material the proper action and reaction for regulating an electric circuit in relative proportion to the sound wave impulses received upon the transmitter diaphragm, which is thus made to act as the pan of a sensitive spring scale.

The attachment may be variously applied to various forms of electrical transmitter variable resistance and will be illustrated in connection with a well-known standard form, but it is understood that I do not intend to limit the invention to any specific construction, although features of the specific construction shown are included within said invention.

The accompanying drawings illustrate the invention as applied to parts found in a commercial electrical telephone transmitter of the well-known Kellogg type.

Figure 1 is a view partly diagrammatic and partly in axial sectional elevation of a telephone circuit comprising a commercial electrical telephone transmitter of the Kellogg type from which the usual solid back adjustment has been removed and my automatic temperature adjustment and sensitizer attachment applied. Fig. 2 is a rear elevation of the same omitting the housing. Fig. 3 is an enlarged fragmental section on line $x^3$, Fig. 2.

In the drawings the well-known housing 1, 2 with sound-collector $a$, cross bar 3, the Kellogg electrical transmitter diaphragm 4 with its cup $b$ for the variable resistance medium 5, its rubber mounting 6, the sound wave impulse actuated, rigidly mounted electrode 7, the opposing electrode 8 and its flexible mica mounting 9 connected to the diaphragm 4 and supporting and insulating the electrode 8, and closing the mouth of the cup $b$ are of the usual Kellogg transmitter construction. The mica mounting is measurably flexible and serves to form a closure for the cup $b$, thus completing the chamber that holds the variable resistance medium in place between the two electrodes.

All of the parts above mentioned are present in the usual Kellogg transmitter in which the opposing electrode 8 is fixed by the post 10 to a solid back not shown in the drawings.

In the present invention, the post 10 that is fixed to the carbon electrode 8 and to the flexible mica mounting 9 is free from any support excepting that afforded by the flexible mounting 9 and the diaphragm 4. In former constructions this post 10 has heretofore been adjusted in a fixed support, not shown, carried on the cross bar 3 that is fixed to the housing. In this invention said post 10 is freely movable being connected to yielding tension means which, in the present instance is a spring 11 that may be of any form; a helical spring being shown. Said spring 11 is connected at one end to the post 10 and at the other end to an adjustable support, consisting in this instance of a rocking arm 12 fulcrumed by a pin 13 to a bearing 14 on an insulating support 15, and adjustable by means of a nut 16 screwed onto a threaded stud 17 that is seated in the insulation 15 and extends through the rocking arm 12 to receive said nut 16. By adjusting the nut, the tension of the resilient tension means 11 may be increased or decreased to establish a permanent adjustment of the electrodes 7, 8 in relation to the variable electrical resistance 5. Damper means 18, which in the form shown is merely a piece of soft india rubber squeezed in between convolutions of the helix 11 is applied to the spring, thereby preventing sustained vibrations of the spring, and making the tension means silent and dead beat.

The yielding tension means 11 applied to the electrode 8 and its flexible mica support 9 and the diaphragm 4 causes the diaphragm 4 and the flexible support 9 to be opposed to each other in balanced relation, all being under tension of the tension means 11 making the diaphragm 4 extremely sensitive to sound wave impulses or the like impinging upon it. Owing to the balanced relation existing between diaphragm 4 and flexible mica support 9, the variable electrical resistance medium 5 inclosed between the electrodes 7 and 8 is acted upon by the sound wave impulses or the like impinging upon the diaphragm 4 and produces in the transmitting circuit, electrical impulses corresponding with the sound wave or the like impulses in intensity and duration.

To construct an electrical transmitter such as is shown in the drawing, a commercial electrical transmitter of the Kellogg type may be taken and denuded of any parts in excess of those shown in the drawings. The insulating support 15 is then applied to the cross bar 3 and the rocking arm, the adjusting screw, and the tension means are applied in an obvious manner. To adjust the transmitter the tension of the spring 11 will be varied by adjusting the nut 16 until the variable resistance acts with maximum efficiency. This is done while speaking into the sound collector or mouth-piece while manipulating the screw 14 and listening in the receiver 22 connected with the leads 20, 21 until the desired result is obtained.

I claim:

1. In combination with the variable resistance of an electrical transmitter; means for increasing the sensitiveness of the variable resistance and for automatically adjusting the same to temperature changes; said means comprising elastic tension means in connection with one electrode of the variable resistance, means for adjusting the elastic tension means, and damper means in combination with said elastic tension means to prevent over-vibration of said elastic tension means for making the said elastic means silent and dead-beat.

2. The combination with sound wave actuated electrodes, variable electrical resistance and means for receiving sound wave impulses, of elastic tension means to yieldingly maintain a uniform separating adjustment between the electrodes of the variable electrical resistance.

3. In a microphone having a variable electric resistance, means for maintaining a fixed operable separating relation between the electrodes of the variable electric resistance to prevent packing of the variable resistance material for electrical transmission purposes.

4. In a microphone having a variable electrical resistance, separating tension means for automatically maintaining permanent maximum efficient adjustment between the electrodes of the variable electrical resistance for electrical transmission purposes.

5. In combination with the variable resistance of an electrical transmitter; adjustable separating tension means for increasing the sensitiveness thereof and for automatically adjusting the same to temperature changes.

6. In combination with the variable resistance of an electrical transmitter; adjustable elastic means for separating the electrodes of the transmitter for increasing the sensitiveness thereof and for automatically adjusting the same to temperature changes.

7. In combination with a diaphragm, having a variable electrical resistance chamber, an electrode rigidly attached to one wall of said chamber, a movably connected electrode in opposition to the rigid electrode, and spring tension means for separating the electrodes and maintaining a spring-balance between one of said electrodes and the actuating diaphragm.

8. The combination with the diaphragm and variable resistance of an electrical transmitter, of means for yieldingly drawing apart producing and maintaining the electrodes of said variable resistance in balanced opposition to each other.

9. In an electrical transmitter having a fixed electrode, a movable electrode, variable resistance medium forming a conductor between said electrodes, and spring-tension means drawing apart said electrodes and for establishing and maintaining a balance between said electrodes.

10. In an electrical transmitter a variable resistance comprising an impulse receiving element, electrodes, a variable resistance medium between the electrodes and elastic dead-beat means for establishing and maintaining a separating balance between said electrodes.

11. The combination with a diaphragm, of an electrode connected thereto, a freely movable electrode, an electrical variable resistance medium between said electrodes and a tension spring connected to the freely movable electrode to draw it away from the fixed electrode to maintain a balanced relation between said electrodes and to prevent packing of the variable resistant material.

12. The combination with a diaphragm, of an electrode connected thereto, a freely movable electrode, an electrical variable resistance medium between said electrodes, a tension spring connected to the freely movable electrode to draw the same away from the fixed electrode and to maintain a balanced relation between said electrodes to avoid packing from temperature changes, and means to regulate the tension of such spring.

In testimony whereof, I have hereunto set my hand at Los Angeles, California, this 29th day of June, 1915.

EDWARD H. AMET.

In presence of—
JAMES R. TOWNSEND.